United States Patent [19]

Nishikawa

[11] Patent Number: 4,719,754
[45] Date of Patent: Jan. 19, 1988

[54] WAVE-ACTIVATED POWER GENERATING APPARATUS

[76] Inventor: Koichi Nishikawa, 58, Komatsu-cho, Toyohashi-shi, Aichi-ken, Japan

[21] Appl. No.: 802,977

[22] Filed: Nov. 29, 1985

[30] Foreign Application Priority Data

Nov. 30, 1984 [JP] Japan ................. 59-251935

[51] Int. Cl.$^4$ ............................. F03B 13/12
[52] U.S. Cl. .......................... 60/501; 60/398; 60/497; 60/502; 417/100
[58] Field of Search ............... 60/398, 495, 497, 502, 60/501, 499; 417/100; 290/53

[56] References Cited

U.S. PATENT DOCUMENTS

| | | | |
|---|---|---|---|
| 3,064,137 | 11/1962 | Corbett, Jr. ................. | 290/53 |
| 4,286,347 | 9/1981 | Modisette ................. | 60/398 |
| 4,383,413 | 5/1983 | Wells ................. | 60/398 X |

Primary Examiner—Allen M. Ostrager
Attorney, Agent, or Firm—Franklin D. Wolffe; Morris Fidelman

[57] ABSTRACT

A wave-activated power generating apparatus in the form of a buoy includes a floatable main body provided with a vertically extending central pipe having its bottom open end opened into the water and its top open end located above the water surface when the main body floats in the water surface, an air turbine disposed at the top open end of the central pipe, a generator operatively coupled to the air turbine, and a plate-shaped guide plate fixedly attached to the main body as located opposite to and separated away from the bottom open end of the central pipe. The provision of the bottom guide plate allows to define a laterally opened circular opening between the guide plate and the bottom of the main body, through which the water moves into and out of the central pipe. This structure allows to use the present apparatus even in shallow waters.

11 Claims, 4 Drawing Figures

WAVE-ACTIVATED POWER GENERATING APPARATUS'

BACKGROUND OF THE INVENTION

1. Field of the Invention

This invention relates to a power generating apparatus activated by water waves, and, in particular, to a wave-activated power generating apparatus in the form of a buoy suitable for use in shallow waters.

2. Description of the Prior Art

Currently, a wave-activated power generating apparatus is in use as a power source for supplying an electric power for the lamp of a nautical mark buoy. Such a nautical mark buoy typically includes at its center a central pipe extending vertically downward with respect to the water surface, and, utilizing a relative motion between the buoy main body moving up and down following the motion of the waves and the water surface inside of the central pipe, there is produced a forced air flow whose energy is then converted into electric power. In this case, in order to obtain an increased power output, it is required that the above-mentioned relative motion be as large as possible. The movement of each section of the water executing the wave motion resembles a circular motion, but its amplitude decreases rapidly as the depth from the water surface increases. Thus, the longer the vertical length of the central pipe of the power generating apparatus, the larger the relative motion between the buoy main body and the water surface inside the central pipe, so that an increased power output can be obtained. However, if the central pipe is made too longer, there are brought about other disadvantages, such as incapability to be used in shallow waters and difficulty to handle and carry out maintenance operations.

SUMMARY OF THE INVENTION

In accordance with the present invention, there is provided a wave-activated power generating apparatus which floats in the water surface in use so as to convert the energy of wave motion into electric power. The present wave-activated power generating apparatus includes a main body floatable in the water surface, an air chamber defined inside of the main body, an electric power generator driven by an air flow flowing between the air chamber and the ambient atmosphere for generating electric power, a working passage defined in the main body to communicate with the air chamber and having an open end at its bottom so as to be filled with the water at least partly when floating in the water surface, and a guide plate fixedly mounted on the main body opposite to and separated away over a predetermined distance from the open end of the working passage thereby defining a substantially lateral circular opening through which the water is guided into and out of the working passage.

It is therefore a primary object of the present invention to obviate the disadvantages of the prior art as described above and to provide an improved water-activated power generating apparatus.

Another object of the present invention is to provide an improved floating type wave-activated power generating apparatus capable to be used in shallow waters while producing a sufficient electrical power output.

A further object of the present invention is to provide an improved wave-activated power generating apparatus high in performance and yet compact in size as well as easy to manufacture.

A still further object of the present invention is to provide an improved wave-activated power generating apparatus easy to handle.

Other objects, advantages and novel features of the present invention will become apparent from the following detailed description of the invention when considered in conjunction with the accompanying drawings.

DESCRIPTION OF THE PREFERRED EMBODIMENTS

Figure 1:
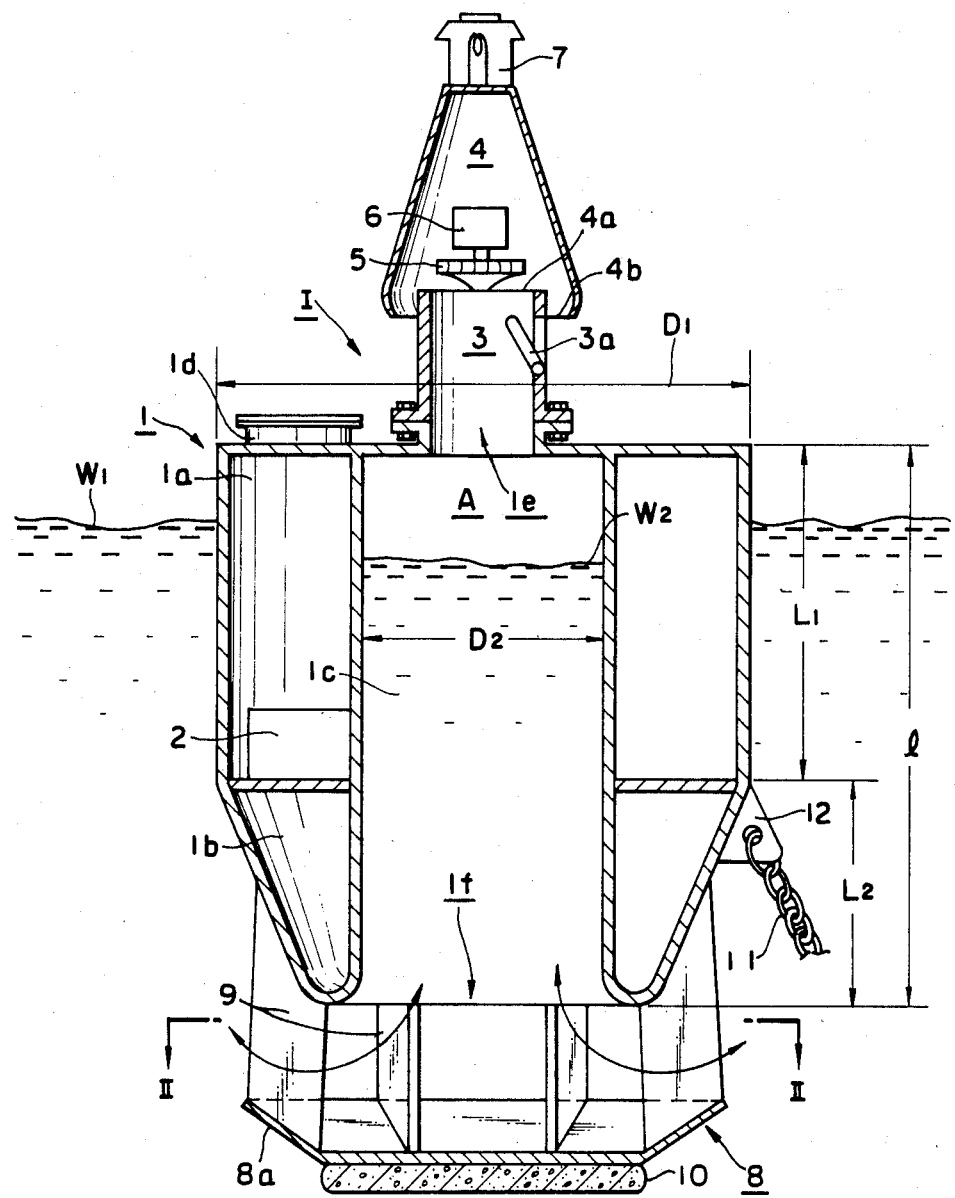
FIG. 1 is a schematic, cross sectional view showing a wave-activated power generating buoy constructed in accordance with one embodiment of the present invention.

Referring now to FIG. 1, there is schematically shown a wave-activated power generating apparatus I in the form of a buoy constructed in accordance with one embodiment of the present invention. As shown, the power generating buoy I includes a main body 1 floatable in the water surface. In the illustrated embodiment, the main body 1 is generally comprised of a float section 1a, which is cylindrical or annular in shape, and a tail section 1b which is generally annular cone-shaped and which is provided at the bottom end of the float section 1a. It is to be noted that the tail section 1b may also be constructed in the form of a float similar to the float section 1a. The main body 1 floats in the water surface with its tail section 1b located at the bottom and thus submerged in the water as shown. For example, the float section 1a may be formed from an iron plate of 2.3 mm thick so as to have a diameter $D_1$ of approximately 1.2 meters and a longitudinal length $L_1$ of approximately 0.9 meters, and the tail section 1b may be formed from an iron plate having the thickness of 3.2 mm so as to provide a longitudinal length $L_2$ of approximately 0.6 meters, though the present invention should not be limited only to these dimensions. The tail section 1b may be formed separately and integrated into the float section 1a, for example, by welding.

Also provided in the main body 1 is a central pipe 1c which extends vertically straight through the main body 1 and it defines a working passage in which the water may move up and down due to wave motion. The central pipe 1 is integrally formed with the float section 1a and the tail section 1b and it may be formed to have the dimensions of approximately 0.58 meters in diameter $D_2$ and approximately 1.5 meters in length. In the illustrated embodiment, an electric power storing device 2, such as a battery, is fixedly mounted inside of the hollow float section 1a, so that the electric power generated may be stored in this battery 2. The main body 1 is also provided with a hatch 1d which may be opened and sealingly closed as is obvious for skilled in the art thereby making it to be accessible to the battery 2 for maintenance and repair.

The central pipe 1c has a top open end 1e which is generally located above the water surface when the buoy I floats in the water surface, and a valve chamber 3 is provided on or above the top open end of the central pipe 1c. The valve chamber 3 is generally defined by a cylindrical member and provided with a one-way valve 3a which may pivot inwardly to draw the air into the valve chamber 3 from the ambient atmosphere but it closes the valve chamber 3 to prevent the outflow of the air to the ambient therethrough. The valve chamber 3 communicates with the central pipe 1c through the top open end thereof so that an air chamber A is defined by the volume of the air confined in the central pipe 1c by the surface of the water inside of the central pipe 1c and the volume of the air inside of the valve chamber 3. It should thus be apparent that the volume of the air inside of the air chamber A increases due to ingress of air into the air chamber A through the valve 3a when the water surface $W_2$ moves down along the central pipe 1c; whereas, the volume of the air inside of the air chamber A decreases when the water surface $W_2$ moves upward along the centeral pipe 1c to have the air discharged through a top opening 4a of the valve chamber 3.

Above the valve chamber 3 is fixedly provided a conically shaped light house 4, and the light house 4 is in communication with the air chamber A through the valve chamber 3. In the vicinity of and slightly above the top opening 4a of the valve chamber 3 is disposed an air turbine 5 which is driven to rotate in a predetermined direction by the air flow through the top opening 4a of the valve chamber 3. Provided above and as operatively coupled to the air turbine 5 is an electric power generator 6 which is driven by the air turbine 5 to generate electricity. At the top of the light house 4 is mounted a lamp 7 which emits light for providing a nautical mark indication. The light house 4 is conically shaped and its bottom end extends down to cover the top end portion of the valve chamber 3 as spaced apart therefrom so that there is defined a ring-shaped discharge opening 4b between the top end portion of the valve chamber 3 and the bottom end portion of the light house 4. As a result, the air discharged from the air turbine 5 may be discharged to the ambient atmosphere through this discharge opening 4b.

With this structure, when the water surface $W_2$ inside of the air chamber A moves upward relative to the central pipe 1c, the air inside of the air chamber A becomes compressed and the valve 3a is set in its closed position so that there is formed a forced air flow flowing through the top opening 4a into the interior space defined by the light house 4 whereby the air turbine 5 is driven to rotate by this forced air flow thereby driving the generator 6 to generate electricity. The electricity thus generated is once stored in the battery 2, which then supplies electric power to the lamp 7 for lighting. On the other hand, when the water surface $W_2$ inside of the central pipe 1c moves downward relative to the central pipe 1c, the air is introduced into the air chamber A from the ambient atmosphere through the valve 3a which takes its open position at this time. In this manner, since the valve 3a takes its open position as soon as the water surface $W_2$ starts to move downward along the central pipe 1c, no reverse air flow is created through the discharge opening 4b, and, thus, the air turbine 5 is insured to rotate always in a predetermined direction.

Figure 2:
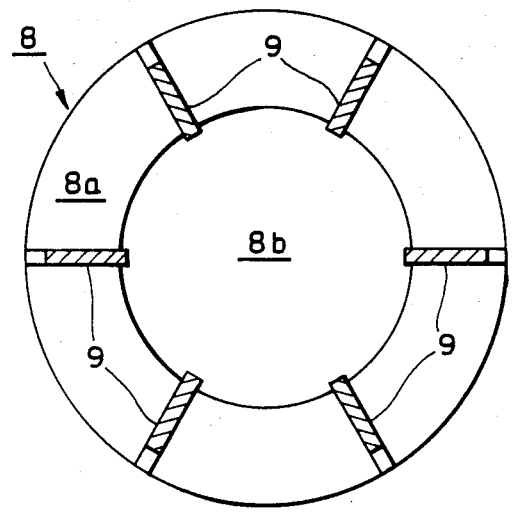
FIG. 2 is a schematic, cross sectional view taken along line II—II indicated in FIG. 1.

The central pipe 1c has an bottom open end 1f which is open into the water when the buoy 1 floats in the water surface so that the water may move into and out of the central pipe 1c due to wave motion of the water through this bottom open end 1f. In accordance with the present invention, there is provided a bottom guide plate 8 which is generally circular in shape in the illustrated embodiment and which is fixedly mounted on the bottom end of the main body 1 as spaced apart over a predetermined distance from the bottom end of the main body 1. In the present embodiment, the guide plate 8 is larger in diameter than the bottom open end 1f of the central pipe 1c and it is located generally opposite to the bottom open end 1f. Preferably, the guide plate 8 is formed in the shape of a plate with its peripheral portion 8a bent somewhat upwardly and it is fixedly attached to the bottom end of the tail section 1b by means of a plurality of supporting struts 9. In this case, preferably, as shown in FIG. 2, the plurality (six in the illustrated embodiment) of supporting struts 9 are arranged in the circumferential direction at equiangular intervals as extending between the upwardly bent peripheral portion 8a of the guide plate 8 and the bottom side surface of the tail section 1b. Thus, there is defined a generally lateral, circular opening between the guide plate 8 and the bottom end of the main body 1, through which the water may move into and out of the working passage defined by the interior space of the central pipe 1c.

With this structure, the lateral movement of a section of the water in wave motion can be guided into the central pipe 1c advantageously and the movement of the water into and out of the central pipe 1c can be made significantly smoother. As also shown in FIG. 1, at the bottom surface 8b of the guide plate 8 is fixedly attached a weight 10 which helps contribute to maintain the posture of the buoy I vertically even if subjected to severe wave motion. Also fixedly provided at the side surface of the main body 1 is a projection 12 to which one end of a chain 11 is connected, and, although not shown specifically, the other end of the chain 11, for example, is connected to an anchor so that the buoy I can be moored at a desired location.

As described above, in accordance with the present invention, since the guide plate 8 is provided as opposed to and spaced apart from the bottom open end 1f of the central pipe 1c, even if the central pipe 1c is relatively shorter in length, there is obtained a relatively large amplitude in the relative motion between the central pipe 1c and the water column located inside of the central pipe 1c, which then allows to use the present power generating buoy even in shallow waters without deterioration in power generating performance. The principle of this power generating mechanism will be described in detail below so as to help better understand the advantages of the present invention.

Figure 3:
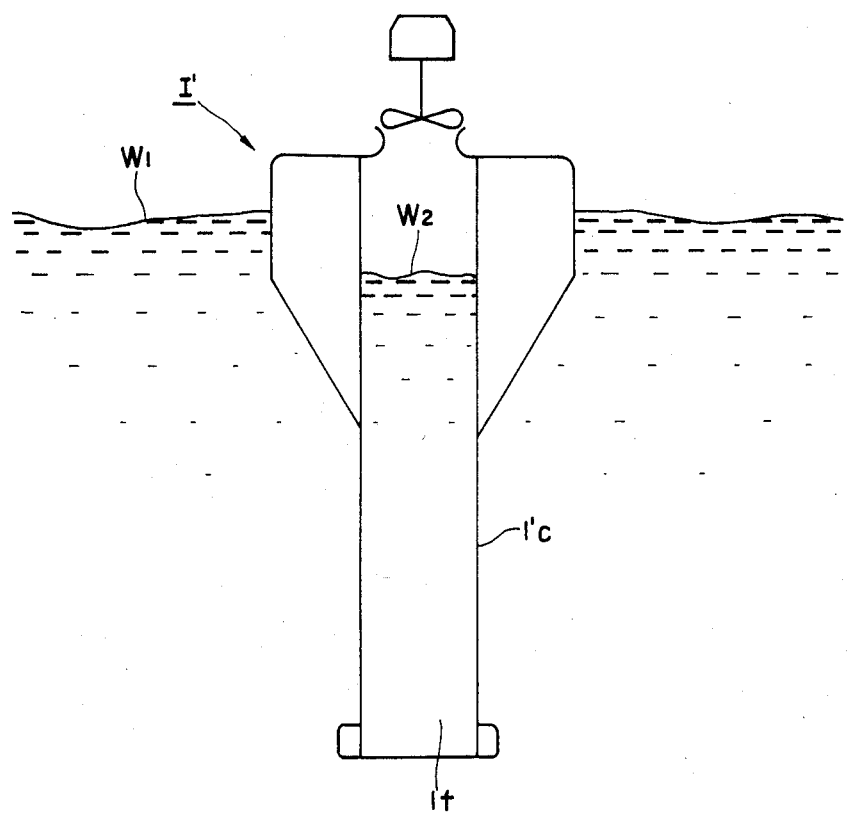
FIG. 3 is a schematic illustration showing a typical prior art floating type wave-activated power generating buoy.

In the first place, the principle of the typical wave-activated power generating apparatus will be described. FIG. 3 illustrates the typical prior art wave-activated power generating buoy I'. In FIG. 3, let us consider the condition in which the wave-activated power generating buoy I' floats in the water surface $W_1$ which is in wave motion at the frequency of $(\frac{1}{2})$Hsinwt. In this case, the buoy I' moves up and down with a slight time delay, but the vertical movement of the buoy I' can also be approximated by $(\frac{1}{2})$Hsinwt. With such a vertical reciprocating movement of the buoy I', the water column inside of the central pipe 1c' tends to execute a relative motion at $-(\frac{1}{2})$Hsinwt. Thus, depending on the magnitude of the amplitude H' of the movement of the water column at the bottom opening 1f' of the central pipe 1c', there is produced a relative motion which is defined by $-(\frac{1}{2})(H-H')\sin wt$. Accordingly, in the case where the bottom opening 1f' is located at a deep level where H' is close to zero, the relative motion can be approximated by $(\frac{1}{2})H\sin wt$; on the other hand, in the case of shallow waters where the bottom opening 1f' is located closer to the water surface $W_1$, H' becomes closer in value to H so that the relative motion of the water column relative to the central pipe 1c' virtually vanishes thereby creating almost no forced air flow usable for production of electricity.

Now, let us consider the period of the relative motion between the water column and the central pipe 1c' described above. Designating the period of oscillation of the water column inside of the central pipe 1c' by $T_w$, the length of the central pipe 1c' by l and the acceleration of gravity by g, then we have the following relation.

$$T_w = 2\sqrt{l/g}$$

The wave-activated power generation actually caused by the buoy I' relies on the waves having the period of oscillation between the period $T_w$ of the water column and the period $T_a$ which is a period of oscillation of the vertical movement of the buoy I'. In order to be possible to carry out the practical wave-activated power generation, it is important that the power generation can be made by waves of a broader range of period which may vary, for example, due to weather conditions or the like. In this respect, it is desirable that the period $T_w$ of oscillation of the water column is as large as possible; however, as described previously, the buoy I' cannot be used in shallow waters if its central pipe 1c' is made too long so as to obtain an increased period $T_w$.

Under the circumstances, in accordance with the present invention, the bottom guide plate 8 is provided as submerged in the water and opposite to the bottom open end 1f of the central pipe 1c. With such a structure, even if the buoy I is moored in shallow waters, the movement of the water at the shallow depth located closer to the bottom open end 1f of the central pipe 1c is prevented to directly act at the bottom open end 1f of the central pipe 1c and the laterally moving water at the shallow depth can be advantageously guided into the central pipe 1c through the guide passage defined between the bottom guide plate 8 and the bottom end of the central pipe 1c. This, in effect, is equivalent to the situation in which the bottom open end 1f is located at a deep level where the wave amplitude H' is substantially at zero. As a result, the motion of the water column inside of the central pipe 1c can be approximated by $-(\frac{1}{2})H\sin wt$, which indicates the possibility to obtain an increased air output. Also regarding the period $T_w$ of oscillating water column, the provision of the bottom guide plate 8 has an effect equivalent to making the central pipe 1c longer, so that the period $T_w$ becomes larger and an air output can be attained stably. If the length l of the central pipe 1c is in the order of 1.5 meters as described previously, the period of oscillation is approximately 1.6 seconds; however, with the provision of the bottom guide plate 8 in accordance with the present invention, it has been found that the period $T_w$ of oscillation could be increased approximately to 2.25 seconds, which is approximately 1.4 times of the value without the bottom guide plate 8. As described above, the wave-activated power generating buoy I of the present invention can produce a desired electric power output stably even if used in shallow waters.

Figure 4:
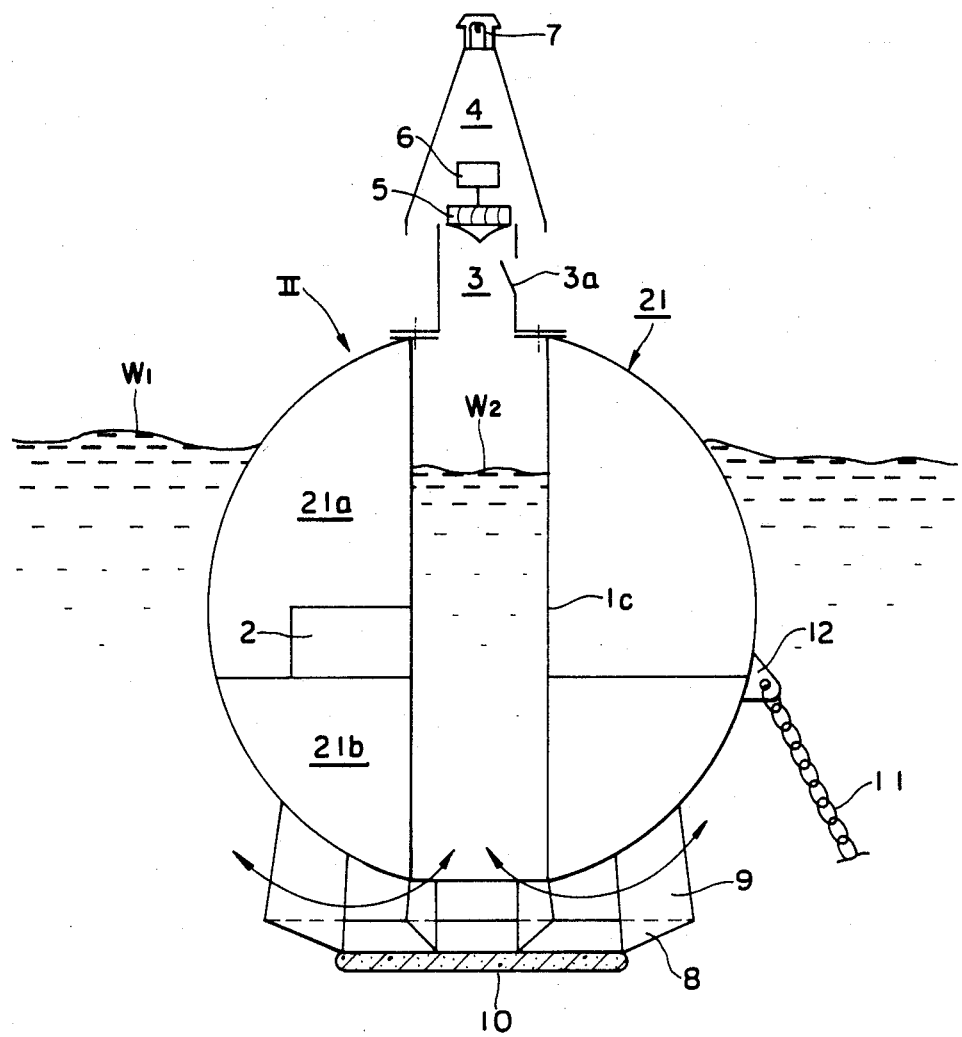
FIG. 4 is a schematic, cross sectional view showing a wave-activated power generating buoy constructed in accordance with another embodiment of the present invention.

Now, another embodiment of the present invention will be described with reference to FIG. 4. It is to be noted that, as practiced throughout the specification and the drawings, like numerals are used to indicate like elements and the repetition of description of the same elements will be avoided as much as possible. FIG. 4 schematically shows a wave-activated power generating buoy II constructed in accordance with another embodiment of the present invention, and it includes a main body 21 which is generally spherical in shape and whose interior is generally divided into a top annular section 21a and a bottom annular section 21b with the provision of the central pipe 1c extending vertically through the spherical main body 21. In the illustrated embodiment, the top annular section 21a is defined as a float section, though the bottom annular section 21b could also be formed as a float section, if desired. The main body 21 is, preferably, comprised of a reinforced plastic material, such as FRP, which can be formed easily and which is high in weather resistance and strength and which allows to make the entire structure light in weight and small in size, not to mention low at manufacturing cost. In this case, there may be a concern that stability could be impaired due to the light-weighted structure, which could involve oscillations other than the up and down motion; however, since the main body 21 of the present buoy II is spherical in shape, the rocking motion of the wave can be advantageously avoided and it is insured that only the vertical component of the wave motion is advantageously applied to the buoy 21 so that the main body 21 can maintain its stable floating orientation.

Similarly with the previously described embodiment, the present buoy II is also provided with the bottom guide plate 8 as located opposite to and vertically spaced apart from the bottom open end of the central pipe 1c of the main body 21. Accordingly, the wave motion is prevented from directly acting at the bottom open end 1f of the central pipe 1c and even the lateral movement of the shallow section of the water in wave motion can be advantageously guided into and out of the central pipe 1c through the laterally opened circular opening defined between the bottom guide plate 8 and the bottom of the spherical main body 21. It should also be noted that even if the main body 21 is spherical in shape, since the substantially flat bottom guide plate 8 is integrally provided below the main body 21, it can be stably placed on the ground for storage, repair, or maintenance.

In the above-described embodiments, use has been made of the single valve 3a to create one-way forced air flow for driving the air turbine 5 in a predetermined direction to activate the generator 6. However, it should be noted that the present invention should not be limited only to this type of generator system. For example, use may be made of any desired number of valves, and an impulse type turbine, which is driven by a one-way air flow created by such a plurality of valves, may also be used. Furthermore, use may also be made of valve-less type turbines which are driven to rotate in a predetermined one direction by the air flow moving in two opposite directions reciprocatingly, such as Wells and Savonius turbines. It should also be noted that the battery 2 could be eliminated, if desired.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A wave-activated power generating apparatus, comprising:
   a main body floatable in the water surface, said main body including a central working passage defined therein as extending vertically straight through said main body, having a bottom open end opened into the water when said main body floats in the water surface and a top open end located above said water surface;
   at least one air turbine rotatably mounted on said main body so as to be driven to rotate by a forced air flow moving through said top open end of said central working passage due to an up and down motion of a water column in the central working passage;
   at least one generator mounted on said main body and operatively coupled to said at least one air turbine so as to be driven by said at least one air turbine to generate electricity; and
   a flat guide plate which is larger in size than the cross section of said central guide passage and fixedly attached to the bottom of said main body as opposed to and spaced apart from said bottom open end of said central working passage through a plurality of supporting struts extending between the bottom of said main body and said guide plate, whereby a lateral passage defined between two adjacent ones of said plurality of supporting struts is in fluid communication with the bottom open end of said central working passage.

2. The apparatus of claim 1 wherein said plurality of supporting struts are arranged circumferentially at equiangular intervals.

3. The apparatus of claim 1 wherein said main body is divided into top and bottom compartments and at least said top compartment is defined as a float section.

4. The apparatus of claim 1 further comprising a weight which is fixedly attached to the bottom surface of said guide plate.

5. The apparatus of claim 1 wherein said guide plate has a peripheral section which is bent upward toward said main body.

6. The apparatus of claim 1 wherein said main body is generally cylindrical in overall shape.

7. The apparatus of claim 1 wherein said main body is generally spherical in overall shape.

8. The apparatus of claim 1 further comprising mooring means having one end connected to said main body.

9. The apparatus of claim 1 wherein said central working passae includes a valve chamber defined at its top, said valve chamber being provided with at least one valve which allows inflow of air from the ambient into said valve chamber but inhibits outflow of air from the valve chamber to the ambient.

10. In a wave-actvated power generating apparatus, having:
    a main body floatable in water at the surface thereof, said main body including a working passage defined therein having a bottom open end extending down into the water when said main body floats in the water surface and a top open end protruding out of said water;
    at least one air turbine rotatably mounted on said main body so as to be driven to rotate by a forced air flow moving through said top open end of said working passage;
    an air compression chamber portion of said working passage, said chamber being situated above a working surface of water within said passage and variable in volume according to displacement of said working surface generally relative to a working length of said passage; and
    at least one generator mounted on said main body and operatively coupled to said at least one air turbine so as to generate electricity in response to said air flow;
    the improvement comprising:
    means, positioned and arranged at said bottom open end of said working passage, for guiding water generally laterally to and from said bottom open end of said working passage while further allowing flow laterally across said open end, said guiding means operatively associated with said working passage and, in effect, increasing said working length of said passage sufficiently to substantially increase said relative displacement between said passage and said working surface without substantially increasing an overall length of said main body, whereby said forced air flow is substantially increased.

11. The improvementof claim 10, wherein the flow laterally across said bottom end allowed by said guiding means constitutes a
    means for minimizing rocking of said passage in response to a horizontal component of wave motion.

* * * * *